(12) United States Patent
Chmara et al.

(10) Patent No.: US 7,289,433 B1
(45) Date of Patent: Oct. 30, 2007

(54) METHOD AND SYSTEM FOR PROVIDING ROBUST CONNECTIONS IN NETWORKING APPLICATIONS

(75) Inventors: Thomas P. Chmara, Richmond (CA); Pedro I. Sanchez, Kanata (CA); Bernard J. Doray, Nepean (CA)

(73) Assignee: Nortel Networks Limited, Quebec (CA)

( * ) Notice: Subject to any disclaimer, the term of this patent is extended or adjusted under 35 U.S.C. 154(b) by 1330 days.

(21) Appl. No.: 09/750,096

(22) Filed: Dec. 29, 2000

Related U.S. Application Data

(60) Provisional application No. 60/242,685, filed on Oct. 24, 2000.

(51) Int. Cl.
*H04L 12/26* (2006.01)
(52) U.S. Cl. .................... 370/219; 370/244
(58) Field of Classification Search ........ 370/216–228, 370/229, 503, 509; 714/13, 6; 379/9.05; 709/225
See application file for complete search history.

(56) References Cited

U.S. PATENT DOCUMENTS

| | | | |
|---|---|---|---|
| 5,014,261 A * | 5/1991 | Shinbashi et al. ........... 370/220 |
| 5,153,578 A * | 10/1992 | Izawa et al. ........... 340/825.21 |
| 5,283,782 A * | 2/1994 | Takase et al. ................ 370/219 |
| 5,444,782 A * | 8/1995 | Adams et al. ............... 713/153 |
| 5,796,717 A * | 8/1998 | Shinbashi et al. ........... 370/216 |
| 5,991,297 A * | 11/1999 | Palnati et al. ................ 370/389 |
| 6,111,852 A * | 8/2000 | Leung et al. ................ 370/217 |
| 6,128,277 A | 10/2000 | Bruck et al. ................. 370/221 |
| 6,148,410 A * | 11/2000 | Baskey et al. .................. 714/4 |
| 6,252,846 B1 * | 6/2001 | Fujita .......................... 370/220 |
| 6,298,038 B1 * | 10/2001 | Martin et al. ................ 370/216 |
| 6,332,198 B1 * | 12/2001 | Simons et al. .................. 714/6 |
| 6,415,418 B1 * | 7/2002 | McLaughlin et al. .......... 716/3 |
| 6,597,826 B1 * | 7/2003 | Ramaswami et al. ......... 385/17 |
| 6,606,315 B1 * | 8/2003 | Albert et al. ................ 370/352 |
| 6,608,841 B1 * | 8/2003 | Koodli ....................... 370/474 |

(Continued)

OTHER PUBLICATIONS

Kenneth P. Birman and Thomas A. Joseph, "Exploiting Virtual Synchrony in Distributed Systems", Association of Computing Machinery, p. 123-138, 1987.

*Primary Examiner*—Brian Nguyen
(74) *Attorney, Agent, or Firm*—Hunton & Williams LLP

(57) ABSTRACT

A method for preventing information losses due to network node failure is disclosed. The method comprises the steps of operatively connecting at least one backup node to a primary node, followed by synchronizing the at least one backup node and the primary node. Next, the method comprises receiving, from a first endpoint, ingress traffic in the primary node and replicating the ingress traffic to the at least one backup node. Next, the method outputs, from the primary mode, primary egress traffic and outputs, from the at least one backup node, backup egress traffic. The method then determines if the primary node has failed. Then, the method transmits, to a second endpoint, the primary egress traffic if it is determined that the primary node has not failed, and transmits, to the second endpoint, the backup egress traffic from a selected one of the at least one backup nodes if it is determined that the primary node has failed.

20 Claims, 4 Drawing Sheets

U.S. PATENT DOCUMENTS

| | | | |
|---|---|---|---|
| 6,658,579 B1 * | 12/2003 | Bell et al. | 713/400 |
| 6,680,946 B1 * | 1/2004 | Isoyama et al. | 370/395.61 |
| 6,687,222 B1 * | 2/2004 | Albert et al. | 370/230 |
| 6,694,450 B1 * | 2/2004 | Kidder et al. | 714/15 |
| 6,711,125 B1 * | 3/2004 | Walrand et al. | 370/223 |
| 6,721,269 B2 * | 4/2004 | Cao et al. | 370/227 |
| 6,735,169 B1 * | 5/2004 | Albert et al. | 370/229 |
| 6,751,191 B1 * | 6/2004 | Kanekar et al. | 370/217 |
| 6,775,229 B1 * | 8/2004 | Mo et al. | 370/220 |
| 6,789,118 B1 * | 9/2004 | Rao | 709/225 |

\* cited by examiner

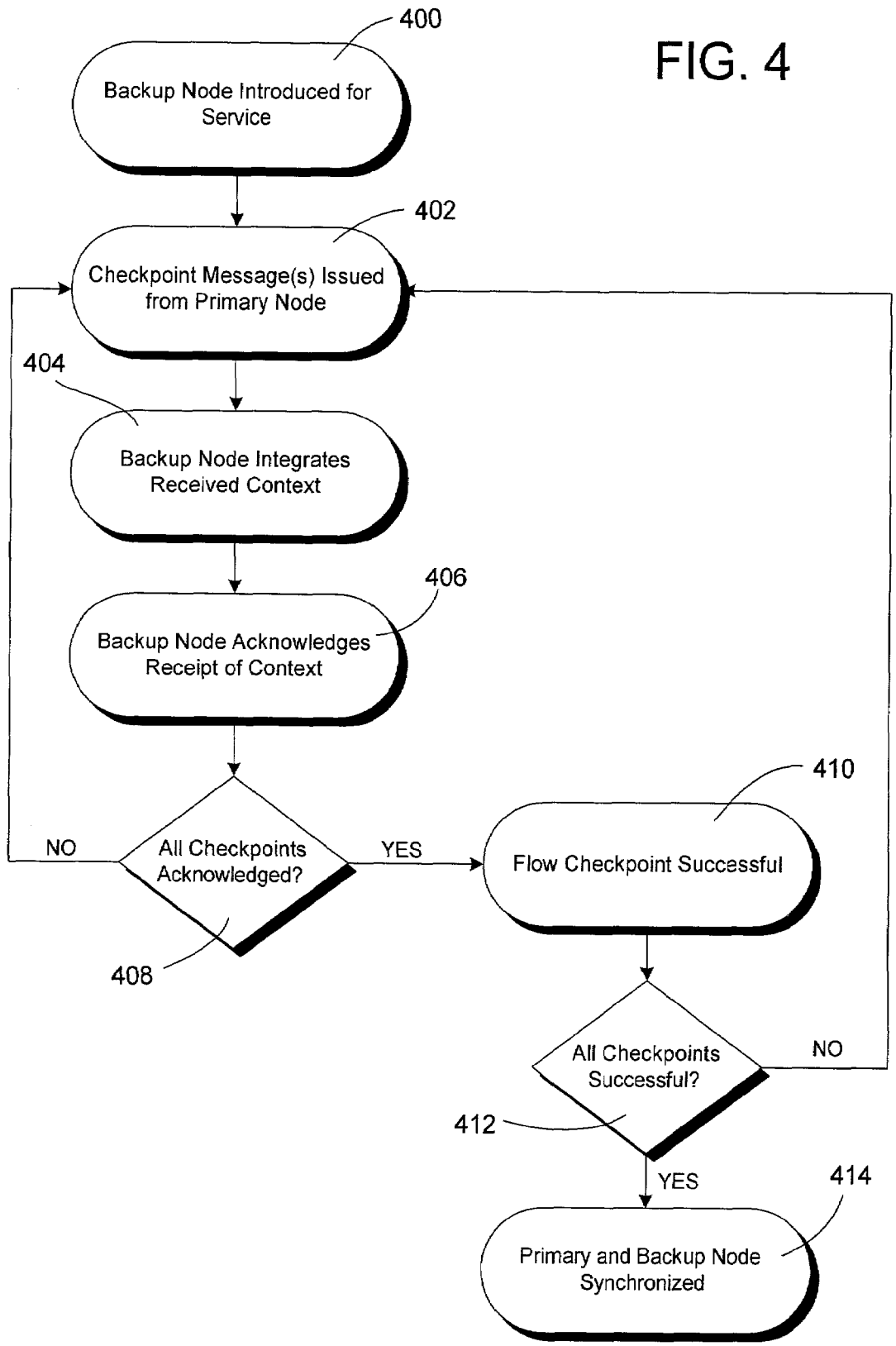

METHOD AND SYSTEM FOR PROVIDING ROBUST CONNECTIONS IN NETWORKING APPLICATIONS

CROSS REFERENCE TO RELATED APPLICATIONS

This application claims the benefit of provisional patent application Ser. No. 60/242,685, filed Oct. 24, 2000, the disclosure of which is incorporated herein by reference.

FIELD OF THE INVENTION

The present invention relates generally to network communications systems and, more particularly, to a technique for effectively managing the flow of information over a network so as to prevent disruptions in service due to network node failures.

BACKGROUND OF THE INVENTION

Use of the computer networks and, in particular the Internet, as a medium for conducting information exchange and business transactions has exploded in the recent past and its unprecedented growth is expected to continue if not increase in the coming years. Unfortunately, the rapid growth and development of the Internet has caused substantial problems with respect to the flow of Internet Protocol (IP) traffic between various nodes on the Internet. Consequently, network architects and administrators have struggled to support and manage the flow of traffic across the network.

In its current form, the Internet's reliability and resiliency to network and nodal failures is poor. Network and nodal failures are caused by a variety of factors such as server failure, client failure, and node failure, however, to network participants it matters little what component failed, the end result is that the current communications session between participants is aborted.

Specifically regarding electronic commercial transactions, any network failure is particularly frustrating in that the buyer is unsure of the particular state the transaction was in when it failed. Accordingly, in order to untangle the present state of the transaction, a substantial amounts of manual intervention is typically required, generally in the form of correspondence with customer service representatives and the like.

In addition to the problems associated with ever-increasing volume of network traffic, additional problems are presented by the format or content of the information being exchanged. For example, the increasing use of graphic and multimedia rich content has inflated the load placed on the network. Also, commercial transactions often require a secure (i.e. encrypted) connection between participants. These transactions require additional processing and network power forming yet another major factor in poor web site performance and/or network failures. Further, performance and scalability mechanisms such as load-balancing software as well as security protocols such as IP Security protocol (IPSEC), Secure Sockets Layer (SSL), and firewalling mechanisms require that more intelligence, at higher levels of the IP protocol stack, be maintained during an association. Accordingly, these higher-level mechanisms effectively act as a proxy between the two endpoints and therefore assume the existence of a robust and error-free communication layer. Because the higher-level mechanisms artificially inform the sending endpoint that the data has been accurately received, prior to this event actually occurring, any subsequent failure on the part of the node goes unrecognized by the sending endpoint and the transaction fails.

In order to combat the effects of failed lower-level network nodes and servers as well as to increase the scalability of the network, load balancers (including both software and hardware-based systems) have been developed which intelligently distribute IP traffic between a group of clustered web servers that collectively host a web site and support its functions. Essentially, the load balancer analyzes the incoming traffic as well as the available servers and determines the most appropriate server to route the traffic to. If one server goes down, the load balancer makes dynamic adjustments in traffic flow, redirecting the user requests to surviving servers, so that the web site stays up and service is maintained at the best possible levels. Referring to secure transactions, a new class of hardware products offload the SSL processing from the web server and restore typical processing rates, resulting in a tremendous boost for e-commerce related sites. These products perform encryption, decryption and transaction processing on their own dedicated hardware platforms without tapping web server resources.

Unfortunately, current state-of-the-industry systems only allow for transfer of relatively static information about a networking association to a secondary node. Some of this information takes the form of network-address information, protocols being used, and perhaps time-synchronization information. However, conventional backup node systems do not dynamically include the information describing a particular networking association, as well as any outstanding traffic, or "session context". Failure of a node and the associated loss of its session context can result in both a loss of performance as well as a loss of the particular transaction. For example, when load balancers, etc. get involved, they store data on-node. Unfortunately, this data has been acknowledged to the ultimate peers in the exchange (i.e. server or client systems) and is therefore not available for retransmission should that balancer/firewall/etc. fail. What this means is that conventional systems, while preventing multiple successive losses due to failed servers or network nodes, do not address or prevent the loss of service associated with the particular failed transaction. This is because the transaction on the relevant node is not replicated elsewhere. In fact, the very nature of the node itself informs the connected peers that the information thereon has been successfully received by the appropriate party when, in fact, such delivery has not yet taken place. Consequently, the failure of this node results in the permanent loss of the information contained thereon.

One example of the cost of session context loss relates specifically to IP backbone ("border") routers which connect independent network service providers such as Qwest, Global Crossing, and Dipex and typically route multiple Gigabits of information across a plurality of discrete connections every second. Essentially, border routers are required to maintain routing tables which describe the topology of all or part of the network and are used in making routing decisions. If one of the border routers crashes, the service provider must renegotiate the router with each of its neighbouring routers, thereby re-creating its routing table, before it is allowed to carry network traffic again. Unfortunately, the re-negotiation process is slow and can take an unacceptable length of time (e.g., tens of minutes) for big core routers such as those described above. While the failed router is down, the traffic which would have been delivered across it is re-routed to other nodes causing a significant loss of performance.

One conventional model which does use replicated control and output information has been used in aviation control systems, telephony switches, and other instances. However, in each of these cases, a dedicated server/backup is configured and, in most cases, supported through hardware or other topological organizations dedicated to the configuration.

In view of the foregoing, it would be desirable to provide a technique for preventing information losses due to network node failures which overcomes the above-described inadequacies and shortcomings and results in more robust connections between clients and servers.

SUMMARY OF THE INVENTION

According to the present invention, a technique for preventing information losses due to network node failures is provided. In one embodiment, the technique is realized by operatively connecting at least one backup node to a primary node. The at least one backup node and the primary node are synchronized. Ingress traffic is received from a first endpoint in the primary node. The ingress traffic is replicated to the at least one backup node. Primary egress traffic is outputted from the primary node and backup egress traffic is outputted from the at least one backup node. It is then determined whether the primary node has failed. If it is determined that the primary node has not failed, the primary egress traffic is transmitted to a second endpoint. However, if it is determined that the primary node has failed, the backup egress traffic from a selected one of the at least one backup nodes is transmitted to the second endpoint, wherein the backup egress traffic replaces the primary egress traffic to the second endpoint and the selected one of the at least one backup nodes becomes the primary node for subsequent traffic.

In accordance with other aspects of the present invention, the primary node and the at least one backup node may be network routers, security engines for receiving encrypted ingress traffic and outputting decrypted egress traffic, or any similar type of network node.

In accordance with further aspects of the present invention, synchronization information is transmitted from the primary node to the at least one backup node. In particular, at least one checkpoint message is transmitted from the primary node to the at least one backup node, wherein the at least one checkpoint message includes static information relating to the primary node as well as any outstanding session context for the primary node. In response to the at least one checkpoint message, at least one checkpoint message acknowledgment corresponding to the at least one checkpoint message is received from the at least one backup node. It is then determined whether each of the at least one checkpoint message acknowledgments was received prior to a change in flow state. If so, a synchronization declaration is transmitted from the primary node to the at least one backup node. However, if each of the at least one checkpoint message acknowledgments was not received prior to a change in flow state, at least one new checkpoint messages is transmitted from the primary node to the backup node.

In accordance with still further aspects of the present invention, synchronization between the primary node and the at least one backup node is periodically assessed.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 is a flow diagram describing a method for initializing and synchronizing a backup node in accordance with one embodiment of the present invention.

DETAILED DESCRIPTION OF EXEMPLARY EMBODIMENT(S)

Figure 1:
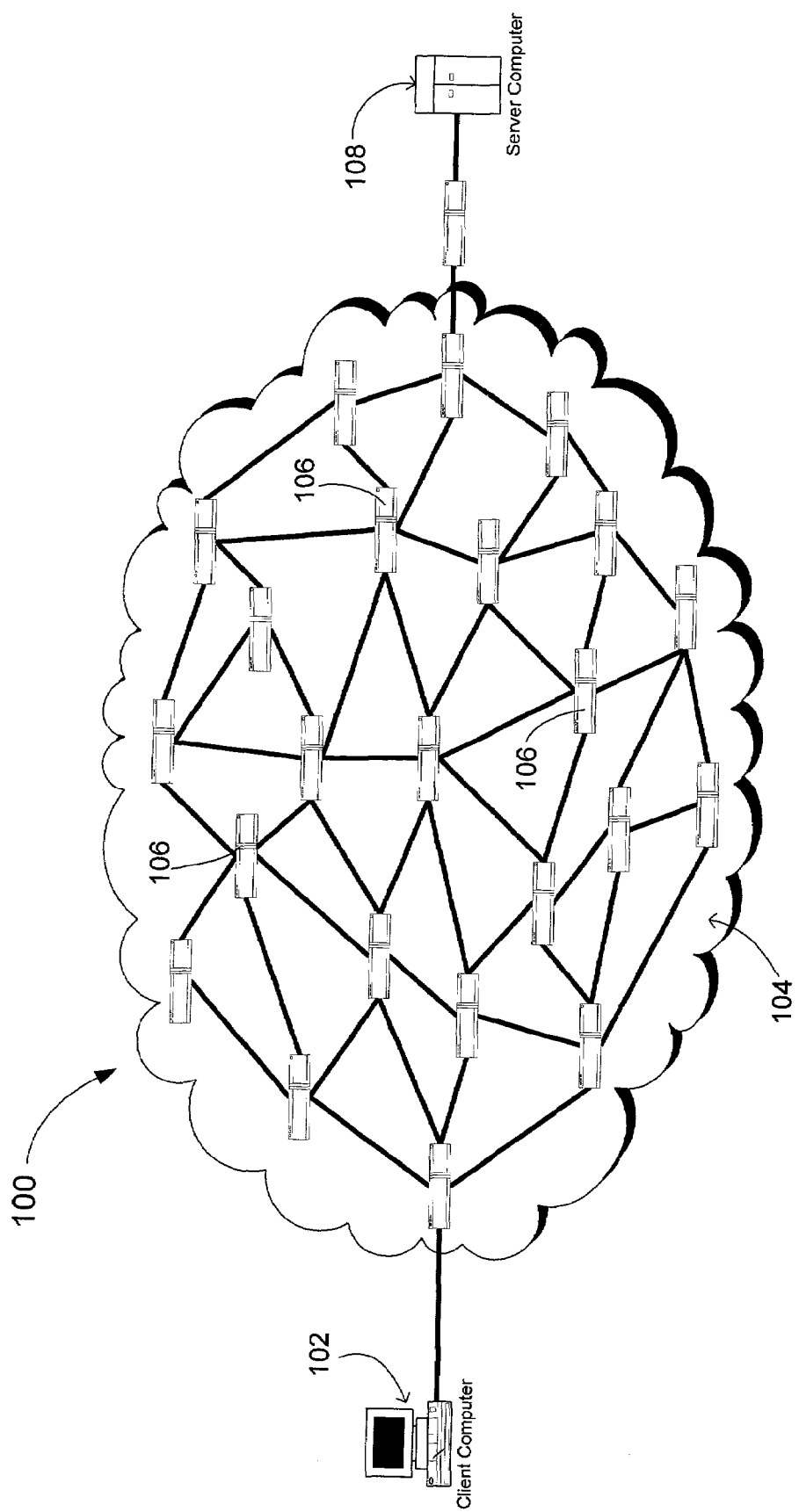
FIG. 1 is a block diagram of a network computer system suitable for implementing a method and system according to the present invention.

Referring to the Figures and specifically to FIG. 1, there is shown a block diagram of a network computer system 100 suitable for implementing a method and system according to the present invention. In particular, the network computer system 100 includes at least one client computer 102, executing at least one client application that both sends network requests and receives responsive network information. Suitable client applications may include network browser applications or thin client programs for remotely running server side applications.

Client computer 102 is connected, typically through a network service provider, to a computer network generally designated by the numeral 104. Network 104 includes at least a plurality of connected nodes 106, wherein each node inspects received information and determines where the information should be sent. Routers, switches, bridges, and security engines are all examples of network nodes 106 that effectively distribute information packets across the network.

At least one server computer 108 is also connected to the network and typically executes at least one server application for providing network services to the client computer 102. Network services may include a wide variety of services such as web site hosting, electronic commercial transaction management, etc. As is known in the art, server computer 108 generally includes a plurality or cluster of individual computers providing either different functions or redundant services so as to more fully support the services being offered.

Using the Internet as one example, client computer 102 sends a request over the network using a pre-defined protocol such as TCP/IP (Transmission Control Protocol/Internet Protocol) or any other suitable protocol (e.g., SIP, SCTP, etc.). Using the pre-defined protocol, the client computer 102 breaks the request into small portions referred to as packets, wherein each packet includes a header having designations relating to the web addresses of the originating client computer and the destination server computer, as well as the particular packet's place in the complete request. Using the protocol, the client computer then delivers the packets into the network 104, where nodes 106 route the packets to the destination address. Because each packet is treated independently, each individual packet may travel over a different route to reach the destination address. At the server computer 108, the protocol identifies the particular packets and, upon receipt of all packets, reassembles them into the original request, whereupon the server computer 108 decides whether or not to respond to the request.

Generally rather than individual computers connected to the network, each node 106 acts to connect a smaller network or subnetwork of computers to the greater network. Generally, these subnetworks are referred to as local area networks (LANs) or wide area networks (WANs). In this way, the various nodes comprising the infrastructure for the entire Internet act as network traffic controllers in that information between computers within a smaller network is not routed through the greater network, thereby decreasing the amount of traffic on the greater network. Further, nodes may be configured as firewalls, or other security devices, so as to prevent certain types of information from entering or exiting a particular subnetwork. Although most network nodes, particularly infrastructure level nodes, generally comprise stand-alone hardware, client or server computers may also be configured to include software designed to perform node functions such as switching and routing packets of information.

Because of the distributed nature of the nodes 106 included in a computer network, a failed network node is conventionally overcome by simply routing subsequent data packets to different nodes. Typically, each node in the network periodically checks the status of all nodes to which it sends information. If a particular node is either unresponsive or affirmatively indicates a failure, the failed packet as well as any subsequent data packets are routed to different nodes. In conventional packet routing, this concept works perfectly well. That is, if a sender of a packet of information does not receive an acknowledgment from the recipient that the packet was successfully delivered, then the sender simply retransmits the packet over a different route. Unfortunately, this practice does not remedy the effects of the node failure when the receipt of the packet has been acknowledged prior to its actual receipt at the destination address. As discussed above, load balancing software, security engines, and other higher level mechanisms often artificially acknowledge receipt to the sender prior to processing and actual delivery to the designated endpoint. Since the packet has already been acknowledged, the sending endpoint does not know that the packet has not been delivered and the information is consequently lost. Similarly, if the failed node is the node immediately controlling all information entering a particular destination computer, this node cannot be circumvented through conventional practices.

Figure 2:
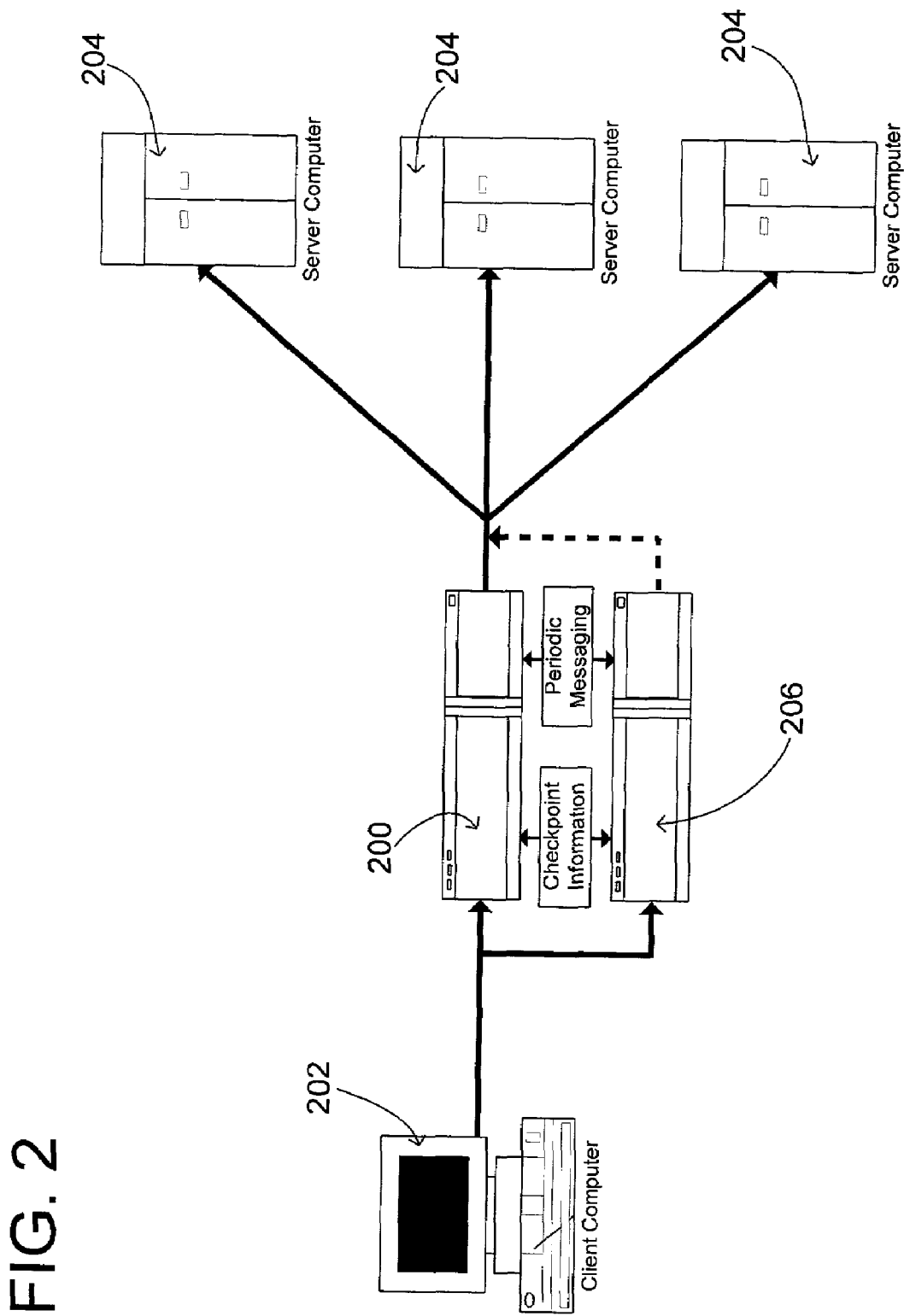
FIG. 2 is a more detailed block diagram of a network computer system including one embodiment of the present invention.

Referring now to FIG. 2, there is shown a more detailed block diagram of a network computer system including one embodiment of the present invention. In particular, a network node 200 (e.g., router, switch, security engine, etc.) receives an HTTP request (or other form of ingress traffic) from a client computer 202 over the computer network.

Using a SSL-based commercial transaction request as an example, the HTTP request is encrypted so as to protect the privacy of the transaction content. In this instance node 200 is a SSL engine which decrypts the content of the request and routes it to an appropriate server. In an alternative embodiment, node 200 may be content-aware. That is, the node may receive all packets of the request, parse the request into its various constituent components (e.g., *.gif; *.html; *.cgi; etc.) and route the various components to specifically assigned servers 204 for processing and fulfillment. By parsing a client request based upon its content, the system is better able to balance the load placed on different servers.

As discussed in detail above, information packets routed through node 200 are conventionally sacrificed if a node failure occurs. Following the failure, subsequent data packets are routed around the failed node, until the node may be renegotiated with its neighboring nodes. However, this convention is problematic in that data packets previously acknowledged as successfully delivered are sacrificed which may cause a transaction or request to fail at an unknown juncture.

In accordance with one embodiment of the present invention, the above-described problems associated with packet sacrifice are remedied by simultaneously passing a copy of all ingress traffic received in node 200 to a backup node 206 for redundant processing. Such copying may be done in any suitable manner including shared hub architecture for relatively simple node arrangements and port mirroring for more sophisticated arrangements. As is known in the art, a shared hub arrangement enables all available ports to see all traffic received at any other port. Alternatively, port mirroring is typically a software controlled feature which provides for copies of packets flowing through a specific port to be sent to another specified port. It should be understood that while a single backup node 206 is described for the purposes of simplicity, an arbitrary number of backups may be provided and implemented in accordance with the present invention. The inclusion of additional backup nodes will be discussed in additional detail below. Initially, each of the related nodes (i.e., the primary node and an arbitrary number of backup nodes) generate egress traffic. However, prior to the recognition of a node failure or other node-switching instructions, the output from the backup nodes is not propagated to the designated endpoint.

Figure 3:
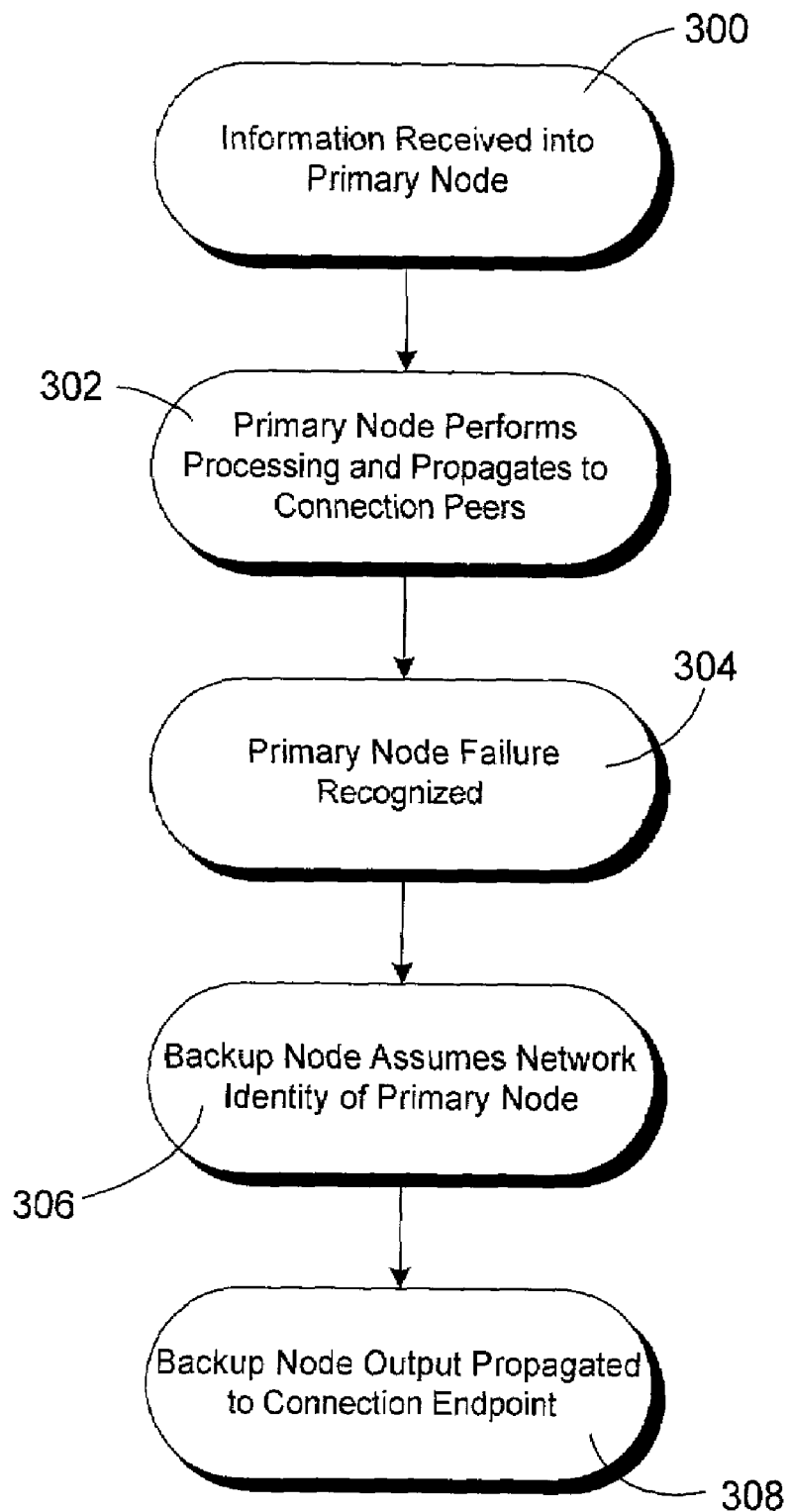
FIG. 3 is a flow diagram describing a method for propagating data in accordance with one embodiment of the present invention.

Referring now to FIG. 3, there is shown a flow diagram describing a method of propagating data in accordance with an embodiment of the present invention. In step 300, information is received into the primary node 200 from a client 202 (this receipt may be direct or, more likely, indirect). In step 302, the primary node 200 performs any required processing and propagates the information to servers 204 through a server-side output. In step 304, a primary node failure is recognized.

Upon detection of an node failure, the backup node 206, in step 306, assumes the network identity of the primary node 200, the extent and nature of which is dependent on the particular protocols being employed. It should be understood that selection of a particular backup node from among a potentially-arbitrary number of backup nodes is not relevant to this description, and is at the discretion of the specific implementation and may involve additional policy concerns. Upon the backup node's assumption of the primary node's network address, the system is configured to subsequently ignore the output of the primary node 200, and to propagate the output of the selected backup node 206 to its connection endpoint in step 308. It should be understood that, although the above description relates to client-initiated requests, information for delivery from a server to a client is handled in a substantially similar manner.

By providing a real-time copy of all ingress traffic to a backup node, data transmission losses are substantially prevented in the event of a node failure. Rather, upon failure, the backup node seamlessly steps in to replace the failed node. As should be understood by those skilled in the art, a perfect copy of all data traffic is not required to benefit from the present invention. Rather, inherent resiliency in the transmission protocols will permit recovery of lost data.

In order to initiate and maintain synchronization between the primary node 200 and each backup node 206, information related to the particular session or sessions being transported must be shared between the nodes. Referring now to FIG. 4, there is shown a flow diagram describing a method for initializing a backup node in accordance with one embodiment of the present invention.

In step 400, at least one backup node 206 is initially introduced for service. This introduction may be as simple as establishing a connection between the two nodes or may require recognition by a node management component. Regardless, once introduced, the primary node 200 issues synchronization information to the backup node 206. Preferably, the synchronization information includes at least one and preferably a series of checkpoint messages to each backup node 206 in step 402. Preferably, the checkpoint messages include static information about the primary node as well as at least a designation as to the primary node's network address. Further, the checkpoint messages preferably include at least one and preferably a series of checkpoint packets. These checkpoint packets include any outstanding session context for the primary node include unacknowledged data packets and the balance of the flow and sequence information. In essence, these packets forward to the backup node any information which was previously received (i.e., before backup node introduction) but not successfully handed off yet to a connection endpoint.

In step 404, the backup node 206 integrates the received session context into its own state and then, in step 406, acknowledges receipt of the received checkpoint messages to the primary node 200. In step 408, the primary node determines whether the checkpoint messages have been acknowledged before the next association state change (a change being defined as either a time-out or newly received traffic) on that flow. If so, the flow is considered to be successfully checkpointed in step 410. However, if a state change occurred prior to a receipt of the checkpoint acknowledgement from the backup node 206, the primary node 200 returns to step 404 and re-originates the checkpoint attempt, either immediately or at a later time. In step 412, the primary node determines whether all session contexts have been successfully checkpointed (i.e., acknowledged prior to an association state change). If so, the primary node 200 transmits an appropriate declaration to the backup node 206 in step 414 and the two nodes are considered to be synchronized. However, if all session contexts have not been successfully checkpointed, the method returns to step 404 and re-origination is attempted.

The "optimistic" approach, where a flow's checkpoint attempt is re-originated (if necessary, and if at all) can be viewed as an optimization of the system. In particular, network traffic is typically dynamic, with various flows constantly originating and concluding. The received event which voids a given flow checkpoint (i.e., is received prior to flow checkpoint acknowledgement) may, in fact, be a flow termination indication. In this case, no re-origination attempt is required, since the subject flow has terminated and synchronization of this flow is no longer necessary.

It should be understood that, although synchronization of the primary and backup nodes includes the issuance and acknowledgement of multiple checkpoint messages, an alternative, more simple arrangement, includes the issuance of periodic maintenance checkpoints from the primary to the backup. The maintenance checkpoints would include a breakdown of all session context and status information on the primary node and would not require acknowledgement by the backup node. Actual synchronization of the nodes would then be confirmed or rejected through separate health monitoring mechanisms. By not requiring individual acknowledgements of the synchronization messages(s) this embodiment is substantially simpler to implement and utilizes substantially less processing capacity.

Using either of the methods set forth above, multiple backup nodes can be brought into synchronization in a sequential manner. In this manner, a system can increase its level of redundancy without interrupting traffic. Further, it is contemplated that multiple backup nodes may be synchronized concurrently through any number of means. In one embodiment, a reliable multicast service may be utilized for distribution of the checkpoint information to multiple backup nodes. Further, arbitrary heuristics may be employed to determine how to accommodate failed reception on one or multiple backup nodes.

Regardless of the manner in which the backup and primary nodes are synchronized, upon receipt of both the primary node's static and session context, the backup node begins to mirror the primary node and track the association or "flow" of information which is replicated on its input stream. In one embodiment, backup nodes may be configured for different types of session context. In this case, the initial checkpoint messages sent from the primary node to the backup nodes identify only that context for which the backup will be responsible for tracking. The backup node then tracks only those flows for which it has a context. Subsequent to initialization, the backup node identifies new traffic flows, but ignores any existing flows until it has a related context passed by the primary node. In this manner, selective content may be backed up to selected nodes thereby improving efficient load balancing of the traffic.

As stated above, once all flows have been checkpointed to the backup node it is considered in synchronization with the primary node. Referring back to FIG. 4, in step 414, synchronization activities from the primary node to all backup nodes reduces to a slower periodic checkpoint of relevant information to provide synchronization maintenance between the nodes. As discussed in detail above, the periodic transmission of synchronization checkpoint information is substantially simpler to implement. In a particular embodiment, periodic messaging for this purpose may include transferring at least a portion of the primary node's internal state information to the backup node, generally via a separate networking association.

By using the native characteristics of the networking environment, the ability to effectively safeguard against session loss is substantially increased in a cost-effective and easily implemented manner. Unlike conventional systems, a system in accordance with the present invention does not require a dedicated or statically-configured topology. Rather, backup nodes may be dynamically added to an existing system, even if the initial system was configured in a non-spared fashion (i.e., one node only). Because network traffic is routed amongst nodes of the network as a part of its native functionality (e.g., port routing and mirroring) ingress traffic can be easily replicated upon receipt at the network interface and concurrently passed to an arbitrary number of backup nodes.

Further, the non-static nature of the inventive system enables it to be dynamically introduced during traffic processing without a loss of service.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for preventing information losses due to network node failure, the method comprising the steps of:
   operatively connecting at least one backup node to a primary node;
   synchronizing the at least one backup node and the primary node;
   receiving, from a first endpoint, ingress traffic in the primary node;
   replicating the ingress traffic to the at least one backup node;
   outputting, from the primary node, primary egress traffic;
   outputting, from the at least one backup node, backup egress traffic;
   determining if the primary node has failed;
   transmitting, to a second endpoint, the primary egress traffic if it is determined that the primary node has not failed; and
   transmitting, to the second endpoint, the backup egress traffic from a selected one of the at least one backup nodes if it is determined that the primary node has failed,
   wherein the backup egress traffic from the selected one of the at least one backup nodes replaces the primary egress traffic to the second endpoint and the backup node becomes the primary node for subsequent traffic.

2. The method of claim 1, wherein the primary node and the at least one backup node are network routers.

3. The method of claim 1, wherein the primary node and the at least one backup node are security engines for receiving encrypted ingress traffic and outputting decrypted egress traffic.

4. The method of claim 1, wherein the step of synchronizing the at least one backup node and the primary node further comprises the steps of:
   transmitting synchronization information from the primary node to the at least one backup node.

5. The method of claim 4, wherein the step of transmitting synchronization information from the primary node to the at least one backup node further comprises the steps of:
   transmitting at least one checkpoint message from the primary node to the at least one backup node, wherein the at least one checkpoint message includes static information relating to the primary node as well as any outstanding session context for the primary node.

6. The method of claim 5, further comprising the steps of:
   receiving, from the at least one backup node, a checkpoint message acknowledgment for each of said at least one checkpoint messages;
   determining whether each of the checkpoint message acknowledgments was received prior to a change in flow state;
   transmitting a synchronization declaration from the primary node to the at least one backup node if it is determined that each of the checkpoint message acknowledgments was received prior to a change in flow state; and
   transmitting at least one new checkpoint message from the primary node to the backup node if it is determined that each of the checkpoint packet acknowledgments was not received prior to a change in flow state.

7. The method of claim 4, further comprising the steps of:
   periodically assessing synchronization maintenance between the primary node and the at least one backup node.

8. The method of claim 7, wherein the step of periodically assessing synchronization maintenance further comprises the step of:
   transmitting at least a portion of internal state information from the primary node to the at least one backup node sufficient to permit replication of primary node traffic on the at least one backup node.

9. The method of claim 1 wherein the step of replicating the ingress traffic to the at least one backup node comprises simultaneously passing a copy of the ingress traffic to the at least one backup node.

10. The method of claim 1 wherein the ingress and egress traffic comprise session context information.

11. An apparatus for preventing information losses due to network node failure, the apparatus comprising:
    a primary node;
    at least one backup node operatively connected to the primary node;
    synchronizing means operatively connected to the primary node and the backup node for synchronizing the at least one backup node and the primary node;
    means for receiving ingress traffic in the primary node from a first endpoint;
    means for replicating the ingress traffic to the at least one backup node;
    means for outputting primary egress traffic from the primary node;
    means for outputting backup egress traffic from the at least one backup node;
    determining means operatively connected to the primary node and the at least one backup node for determining whether the primary node has failed;
    means for transmitting the primary egress traffic from the primary node to a second endpoint if the determining means determine that the primary node has not failed; and
    means for transmitting the backup egress traffic from a selected one of the at least one backup nodes to the second endpoint if the determining means determine that the primary node has failed.

12. The apparatus of claim 11, wherein the primary node and the at least one backup node are network routers.

13. The apparatus of claim 11, wherein the primary node and the at least one backup node are security engines for receiving encrypted ingress traffic and outputting decrypted egress traffic.

14. The apparatus of claim 11, wherein the synchronizing means further comprise:
   means for transmitting synchronization information from the primary node to the at least one backup node.

15. The apparatus of claim 14, wherein the means for transmitting synchronization information further comprise:
   means for transmitting at least one checkpoint message from the primary node to the at least one backup node, wherein the at least one checkpoint message includes static information relating to the primary node as well as any outstanding session context for the primary node.

16. The apparatus of claim 15, further comprising:
   means for receiving in the primary node, from the at least one backup node, a checkpoint message acknowledgment for each of said at least one checkpoint message;
   second determining means for determining whether each of the checkpoint message acknowledgments was received prior to a change in flow state;
   means for transmitting a synchronization declaration from the primary node to the at least one backup node if it is determined that each of the checkpoint message acknowledgments was received prior to a change in flow state; and
   means for transmitting at least one new checkpoint message from the primary node to the backup node if it is determined that each of the checkpoint message acknowledgments was not received prior to a change in flow state.

17. The apparatus of claim 14, further comprising:
   means for periodically assessing synchronization maintenance between the primary node and the at least one backup node.

18. The apparatus of claim 17, wherein the means for periodically assessing synchronization maintenance further comprise:
   means for transmitting at least a portion of an internal state of the primary node to the backup node sufficient to permit replication of primary node traffic on the at least one backup node.

19. The apparatus of claim 11 wherein the means for replicating the ingress traffic to the at least one backup node comprises means for simultaneously passing a copy of the ingress traffic to the at least one backup node.

20. The apparatus of claim 11 wherein the ingress and egress traffic comprise session context information.

\* \* \* \* \*